June 4, 1963  F. R. BRAVENEC  3,092,719
MEANS AND TECHNIQUES FOR PRODUCING A
RECIPROCAL OF AN ELECTRICAL QUANTITY
Filed March 11, 1959

INVENTOR.
FRANK R. BRAVENEC
BY
Lyon Lyon
ATTORNEYS

United States Patent Office 3,092,719
Patented June 4, 1963

3,092,719
MEANS AND TECHNIQUES FOR PRODUCING A RECIPROCAL OF AN ELECTRICAL QUANTITY
Frank R. Bravenec, Houston, Tex., assignor to Halliburton Company, a corporation of Delaware
Filed Mar. 11, 1959, Ser. No. 798,706
2 Claims. (Cl. 235—193)

The present invention relates to improved means and techniques for deriving from a first electrical quantity, a second electrical quantity which is an indication of the mathematical reciprocal of the first quantity, the present invention being particularly useful in well bore logging equipment wherein it is desired to record logging information, otherwise recordable in the form of a conductivity log, in the form of a resistivity log or vice versa.

In some forms of well logging operations as, for example, in induction well logging where the effect of magnetically induced eddy currents in earth formations on a receiver coil are measured or indicated, the indications or measurements made vary in substantially direct proportion to the current flowing in the earth formations under investigation. This means that a plot of such indications or measurements with respect to the position of the logging tool in the well bore results in a conductivity-type log, as distinct from a resistivity-type log, since conductivity in accordance with Ohm's laws is equal to $$\frac{I}{E}$$

where I is the current and E is the voltage causing such current flow in the formations. In other words, the term I is in the numerator of the above expression, and thus as I increases the indicated or measured conductivity increases also. Usually in systems of this type of logging, the quantity E is assumed to be constant since usually a transmitter coil which causes the eddy currents is supplied with a constant current.

It is oftentimes desirable for many reasons, for example, for comparison with other logs and for perhaps enhanced accuracy, where formation conductivity is low, to convert these indications or measurements in such form so as to obtain a resistivity log. This, in effect, involves the provision of means receptive to the incoming I signal and functioning to derive a second quantity which is in proportion to the inverse or mathematical reciprocal of I, i.e.

$$\frac{1}{I} \text{ or } \frac{K}{I}$$

where K is a constant, and then applying such second derived quantity to a recording galvanometer in which the movable element is deflected in accordance with the reciprocal of I in which case a resistivity log is obtained. It is understood, of course, that resistivity is the inverse or mathematical reciprocal of conductivity.

In other types of logging systems as, for example, in the various forms of electrical logging systems, the current flowing through the formations may be maintained constant and a resulting voltage drop is indicated. In such case a recording of the voltage drop results in a resistivity-type log since, as the resistivity increases, the indicated or measured voltage drop increases also. Instead of recording indications of such voltage drop for purposes of obtaining a resistivity-type log, it may become more desirable to record a conductivity-type log; and in such case, the same form of means alluded to above is first used to obtain an inversion or reciprocation of the signal prior to recording.

It is therefore an object of the present invention to provide improved means and techniques of the character indicated above whereby either conductivity or resistivity type logs may be produced from information which otherwise, when recorded, would be in the form of a different type log.

Another object of the present invention is to provide an improved inverted or reciprocating circuit for these purposes, characterized in that it has a large dynamic range, i.e. has the capability of producing accurate results over a large range of input signals corresponding either to I or E as the case may be.

Another object of the present invention is to provide an improved inverting or reciprocating circuit for these purposes in which problems of damping and sensitivity are not critical for maintenance of response speed, resolution and stability, as in the case of prior art arrangements such as, for example, in computing servomechanisms.

Another object of the present invention is to provide improved means and techniques for these purposes which are devoid of mechanical components that require considerable space and operating power.

Another object of the present invention is to provide improved means and techniques for these purposes which do not require the use of moving parts such as, for example, slidewires or mechanical connections which are subject to deterioration and wear in use and thus are a potential source of error and failure.

Another object of the present invention is to provide means and techniques for these purposes which do not rely on characteristics or accuracy of non-linear devices.

Another object of the present invention is to provide improved means and techniques for these purposes characterized by the fact that the same involves a self-balancing, all electronic system.

Another object of the present invention is to provide an improved system of this character featured by its large dynamic range, its extremely fast response to variation in the input signal which is to be inverted, its reduced space and power requirements, and one which may be transistorized if desired.

Another object of the present invention is to provide an improved system of this character which is easy to instrument with accuracy.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1:
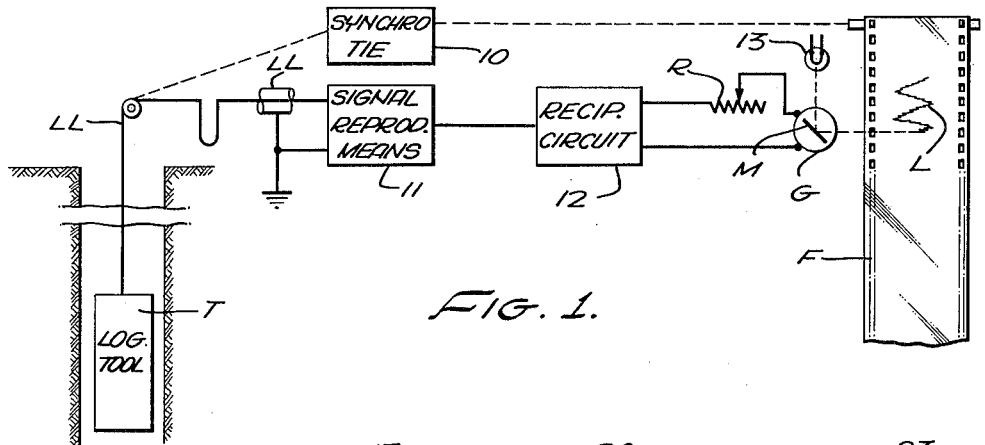
FIGURE 1 illustrates a well bore logging system embodying features of the present invention.

FIGURE 1 illustrates generally a well bore logging system in which the present invention is particularly useful. A log L, either of the conductivity or resistivity type, as the case may be, is produced on a photographic film F which is driven in timed relationship with movement of the logging tool T when and as the same is moved in the well bore past the various earth formations traversed by such well bore. This relationship between movement of the logging tool T and film F is indicated generally by the synchro tie 10 in FIGURE 1 which indicates and is representative of well known means whereby the film F is moved synchronously with the logging line LL for producing this result.

The logging tool T may be any one of the well known types and incorporates means whereby a signal is developed which is an indication or a measure of a characteristic of the formations adjacent the logging tool. For example, in an induction logging system, the signal may be a voltage developed in a receiver coil in response to eddy currents induced in such formations, and thus be representative of formation conductivity; or in the case of an electrical logging system, the signal may be an indication of a voltage drop across the formation and thus be a measure of the formation resistivity. In either case, the signal is transmitted using conventional means over the logging line LL to surface equipment which includes conventional signal-reproducing means 11 indicated as such for producing a signal representative of the signal developed in the logging tool T. The signal, so reproduced and in representative form, is applied to the reciprocating circuit 12, and the output thereof is applied to the recording galvanometer G through an attenuator represented by adjustable response R, if so desired. The galvanometer mirror M is thus deflected proportionately in accordance with the amplitude of the output signal developed in the reciprocating circuit 12, and serves to direct a beam of light from lamp bulb 13 onto film F to produce the log L.

Figure 2:
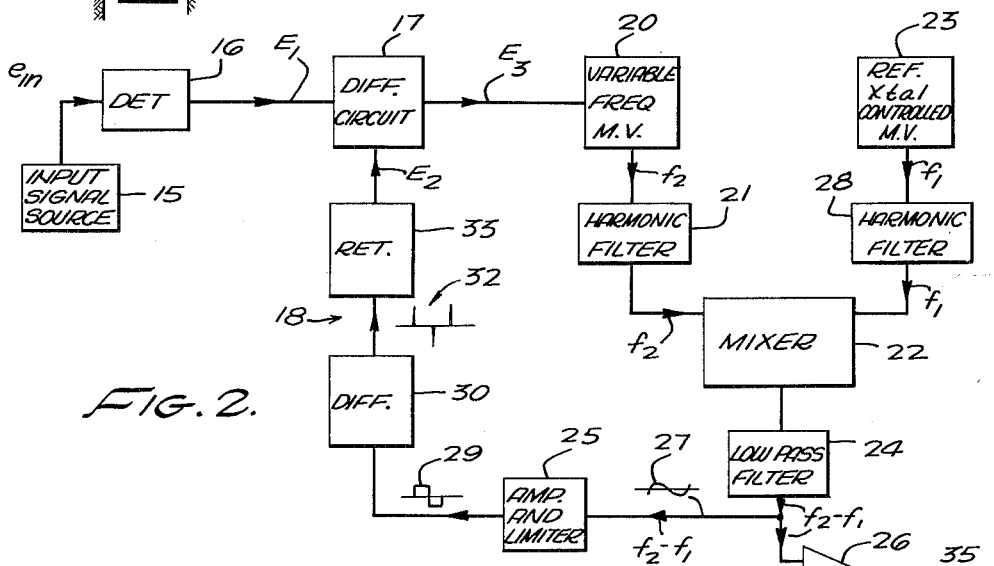
FIGURE 2 illustrates an improved reciprocating system which is incorporated in the system illustrated in FIGURE 1 and which embodies features of the present invention.

The system shown in FIGURE 2 receives an input signal from the signal-reproducing means 11 in FIGURE 1 and the same is indicated generally as an input signal source 15 in FIGURE 2 supplying a voltage $e_{in}$ which may be an amplitude modulated signal. This signal is rectified in detector or converting means 16 to produce a unidirectional or D.C. voltage $E_1$ which is then applied to the difference circuit 17 for comparison with the unidirectional or D.C. voltage $E_2$ obtained from a signal channel 18 in a manner described later.

The difference circuit 17 makes a comparison between $E_1$ and $E_2$ and supplies an amplified D.C. error or difference signal $E_3$ to a variable frequency multivibrator circuit 20. The multivibrator stage 20 oscillates at a frequency $f_2$ responsive to the value of the D.C. signal $E_3$, i.e., the frequency $F_2$ varies with the value of voltage $E_3$. The output voltage of the M.V. stage 20 at frequency $f_2$, after being subjected to a harmonic filter 21, for purposes of eliminating harmonics of frequency $f_2$, is applied to the mixer stage 22 where the same is mixed with a similar voltage of frequency $f_1$ derived in similar manner from the reference or precision crystal-controlled M.V. stage 23 and supplied to mixer stage 22 through a harmonic filter 28 similar to harmonic filter 21. It is understood that the frequency $f_2$ is greater than the frequency $f_1$ although like results are obtained when $f_1$ is greater than $f_2$.

The output of mixer 22 comprises a plurality of voltage components of frequency $f_1$, $f_2$ and $f_2-f_1$ and $f_2+f_1$ resulting from well known mixing action in mixer 22. Since only the voltage component of frequency $f_2-f_1$ is used in this particular example, the output of mixer stage 22 is applied to the low-pass filter 24 which passes only the voltage component of beat frequency $f_2-f_1$ to, on the one hand, the amplifier and limiter stage 25 in the aforementioned channel 18 and, on the other hand, to the input circuit of amplifier 26. This voltage component of frequency $f_2-f_1$ is essentially a sine wave as illustrated at 27 and after the same has been limited to a predetermined magnitude in limiter stage 25, appears as a square top wave as illustrated at 29 which is then applied to the differentiator stage 31 which functions to produce in its output circuit a peaked voltage output represented at 32; and the same is then rectified in rectifier stage 33 to produce the aforementioned D.C. voltage $E_2$ which is applied to the difference circuit 17 which functions, as previously described, to develop the error or difference signal $E_3$.

Figure 4:
FIGURES 4 and 5 are graphs for purposes of illustrating features of the present invention.

It will be seen from the above description that the voltage $E_2$ is proportional to the frequency $f_2-f_1$; and further that the voltage 27 at the output of filter 24 is a wave which has a substantially constant maximum amplitude with, however, a frequency $f_2-f_1$ which is directly proportional to the D.C. voltage $E_1$ and/or the amplitude of $e_{in}$. This is indicated in FIGURE 4 where the straight line is plotted with $e_{in}$ as abscissae and $f_2-f_1$ as ordinates.

Figure 3:
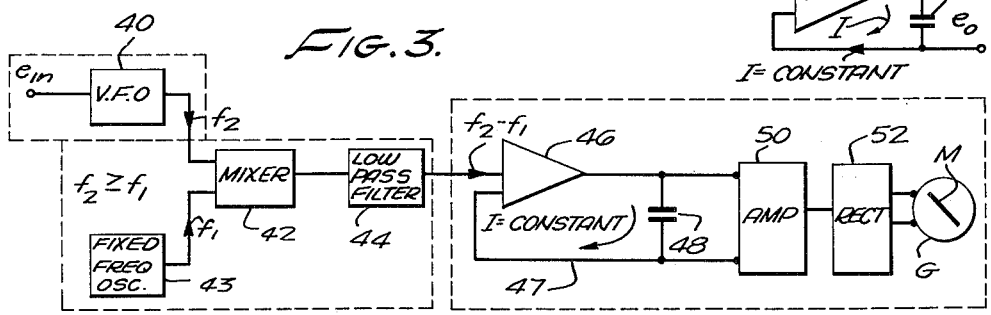
FIGURE 3 illustrates a modified form of reciprocating circuit also embodying features of the present invention.
Figure 5:
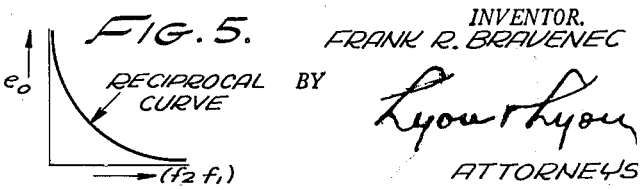

As indicated previously, this voltage or wave of frequency $f_2-f_1$ is applied to the amplifier 26. This amplifier 26 has a constant current feedback loop which includes a condenser 35. Such constant current produces a voltage drop $e_o$ across condenser 35 in accordance with the following expression:

$$e_o = \frac{I}{2\pi f c}$$

where $f$ equals $f_2-f_1$ and varies directly as the amplitude of either $e_{in}$ or $E_1$. This is indicated in FIGURE 5 where the plotted curve is plotted with $f_2-f_1$ as abscissae and $e_o$ as ordinates. Thus, the amplitude of $e_o$ varies inversely as the amplitude of $e_{in}$. This voltage $e_o$ is amplified in a high input impedance amplifier having its output rectified and then applied to a suitable measuring or indicator such as the recording galvanometer as indicated in FIGURES 1 and 3.

In a typical system the frequency $f_1$ is maintained constant at a frequency of 100 kilocycles (kc.) per second; and $f_2$ may vary from 100.05 to 120.00 kc. per second. Thus, $f_2-f_1$ will vary from 50 to 20,000 cycles per second; and $E_o$ may thus be made substantially linear within this range with the smallest reading being 50/20,000 or .25% of the largest reading on a meter such as galvanometer G.

In some cases it may be preferred to eliminate some of the elements from the channel 18 such as the stages 25, 30 and 33 and to use a sine wave oscillation instead of square wave oscillations such as those obtained from the M.V. stages 20 and 23. Thus, for example, the system shown in FIGURE 3 embodying important principles of the present invention which are also embodied in FIGURE 2 may be used.

In FIGURE 3 it is again assumed that the frequency $f_2$ is greater than the frequency $f_1$ (although $f_1$ may be greater than $f_2$ if so desired) and that $e_{in}$ represents an amplitude-modulated sine wave that must be rectified to recover the lower frequency intelligence, i.e. modulation components or the logging-type signal.

Thus, in FIGURE 3 the variable frequency oscillator 40 which produces a sine wave has its frequency controlled by the amplitude of $e_{in}$ to produce a sine wave voltage having the variable frequency $f_2$. This voltage is mixed in mixer stage 42 with a sine wave voltage derived from the fixed frequency oscillator 43 of frequency $f_1$. The beat frequency $f_2-f_1$ only, i.e. only the lower side band, is passed by the low-pass filter 44 so that only a voltage of frequency $f_2-f_1$ is applied from filter 44 to the input circuit of amplifier 46 which incorporates a constant current feedback path in which the condenser 48 is a series-connected element. The voltage thus developed across condenser 48 is inversely proportional to $f_2-f_1$ in accordance with the above description of FIGURE 2. This A.C. voltage across condenser 48 is amplified in the high impedance input amplifier 50 having its output rectified in rectifier 52 which functions to supply a D.C. varying current to the meter represented by recording galvanometer G.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a system of the character described wherein it is desired to obtain the mathematical reciprocal of a varying signal, the combination comprising, a source of said varying voltage, a variable frequency oscillation means, constant frequency oscillation means, mixing means coupled to both said variable frequency and said constant frequency means and functioning to derive a voltage output characterized by a beat frequency in accordance with the difference of said varying frequency source and said constant frequency source, means controlling said variable frequency means in accordance with both said variable signal and said beat frequency voltage, impedance means having a magnitude which varies inversely with respect to frequency, means applying said voltage output to the last mentioned means, and means indicating the voltage produced across said impedance means by said voltage output, said last mentioned voltage across said impedance means varying in amplitude in reciprocal relationship with respect to said varying voltage, said variable frequency source and said constant frequency source each comprising a multivibrator, and said means whereby said variable frequency source is controlled by said beat frequency voltage comprises means whereby said beat frequency voltage is first limited in amplitude, then differentiated and combined with said varying signal to produce a modified beat frequency voltage which together with said varying signal controls said variable frequency source.

2. A system as set forth in claim 1 in which said varying signal and said modified beat frequency voltage are applied to a differencing circuit to derive a difference voltage which controls said variable frequency means.

References Cited in the file of this patent

UNITED STATES PATENTS

| | | |
|---|---|---|
| 2,300,709 | Smith | Nov. 3, 1942 |
| 2,337,328 | Hathaway | Dec. 21, 1943 |
| 2,393,717 | Speaker | Jan. 29, 1946 |
| 2,581,394 | Dinger | Jan. 8, 1952 |
| 2,794,918 | Bourgonjon et al. | June 4, 1957 |